United States Patent
Gockel et al.

(10) Patent No.: US 8,826,660 B2
(45) Date of Patent: Sep. 9, 2014

(54) EXHAUST GAS SYSTEM

(75) Inventors: Tobias Gockel, Meschede (DE); Uwe Fischer, Bad Arolsen (DE); Ralph Naubert, Neumarkt (DE); Jörg Horstmann, Gütersloh (DE); Frank Fetscher, Hövelhof (DE)

(73) Assignee: Benteler Automobiltechnik GmbH, Paderborn (DE)

(*) Notice: Subject to any disclaimer, the term of this patent is extended or adjusted under 35 U.S.C. 154(b) by 1219 days.

(21) Appl. No.: 12/718,191

(22) Filed: Mar. 5, 2010

(65) Prior Publication Data

US 2010/0223911 A1 Sep. 9, 2010

(30) Foreign Application Priority Data

Mar. 5, 2009 (DE) .................. 10 2009 011 379

(51) Int. Cl.
| | |
|---|---|
| *F02B 33/44* | (2006.01) |
| *F01N 1/00* | (2006.01) |
| *F02B 37/02* | (2006.01) |
| *F01N 13/18* | (2010.01) |
| *F01N 13/10* | (2010.01) |

(52) U.S. Cl.
CPC ............... *F01N 13/10* (2013.01); *F02B 37/02* (2013.01); *F01N 13/1811* (2013.01); *F01N 13/102* (2013.01); *Y02T 10/144* (2013.01); *F01N 2450/22* (2013.01); *F01N 13/1861* (2013.01)
USPC ................. 60/605.3; 60/602; 60/322; 60/323

(58) Field of Classification Search
USPC ........................ 60/320–323, 597, 598, 602, 60/605.1–605.3
See application file for complete search history.

(56) References Cited

U.S. PATENT DOCUMENTS

| | | | |
|---|---|---|---|
| 3,948,052 A | 4/1976 | Merkle et al. | |
| 4,194,484 A * | 3/1980 | Kirchweger et al. | 60/321 |
| 4,294,073 A * | 10/1981 | Neff | 60/597 |
| 6,038,855 A * | 3/2000 | Markstrom et al. | 60/323 |
| 6,062,024 A * | 5/2000 | Zander et al. | 60/597 |
| 6,256,990 B1 | 7/2001 | Itoh | |
| 6,523,343 B2 * | 2/2003 | Durr et al. | 60/323 |
| 6,688,103 B2 * | 2/2004 | Pleuss et al. | 60/605.1 |
| 7,234,302 B2 * | 6/2007 | Korner | 60/602 |
| 7,371,047 B2 * | 5/2008 | Burmester et al. | 415/204 |
| 7,971,431 B2 * | 7/2011 | Diez et al. | 60/323 |
| 8,291,699 B2 * | 10/2012 | Gonzalez et al. | 60/323 |
| 2004/0109759 A1 * | 6/2004 | Korner | 60/602 |
| 2005/0097886 A1 * | 5/2005 | Geminn et al. | 60/323 |
| 2005/0126163 A1 * | 6/2005 | Bjornsson | 60/598 |
| 2005/0144946 A1 * | 7/2005 | Claus | 60/605.1 |
| 2005/0241303 A1 * | 11/2005 | Nording et al. | 60/323 |

(Continued)

FOREIGN PATENT DOCUMENTS

| | | |
|---|---|---|
| DE | 103 07 028 B3 | 5/2004 |
| DE | 10 2004 009 109 | 9/2005 |

(Continued)

*Primary Examiner* — Thai Ba Trieu
*Assistant Examiner* — Ngoc T Nguyen
(74) *Attorney, Agent, or Firm* — Henry M Feiereisen LLC

(57) ABSTRACT

An exhaust gas system includes a turbocharger housing and an exhaust manifold having manifold pipes and connected to the turbocharger housing. The turbocharger housing has a pipe collector extending in a direction of the exhaust manifold for connection of the manifold pipes.

12 Claims, 3 Drawing Sheets

(56) References Cited

U.S. PATENT DOCUMENTS

| | | |
|---|---|---|
| 2007/0289954 A1 | 12/2007 | Bien et al. |
| 2008/0203725 A1* | 8/2008 | Willeke .................. 60/322 |
| 2009/0139220 A1* | 6/2009 | Schmelzer .............. 60/323 |
| 2009/0158724 A1* | 6/2009 | Muller .................... 60/323 |
| 2010/0154416 A1* | 6/2010 | Bruce et al. ............. 60/323 |
| 2011/0008158 A1* | 1/2011 | Boening et al. ......... 415/200 |
| 2011/0016859 A1* | 1/2011 | Schumnig ............... 60/323 |
| 2011/0252775 A1* | 10/2011 | Joergl et al. ............ 60/321 |
| 2012/0093631 A1* | 4/2012 | Joergl et al. ............ 415/145 |
| 2012/0297756 A1* | 11/2012 | Koch et al. .............. 60/323 |

FOREIGN PATENT DOCUMENTS

| | | |
|---|---|---|
| DE | 699 27 233 T2 | 7/2006 |
| EP | 1 536 141 A1 | 6/2005 |
| FR | 2 849 469 | 7/2004 |

\* cited by examiner

EXHAUST GAS SYSTEM

CROSS-REFERENCES TO RELATED APPLICATIONS

This application claims the priority of German Patent Application, Serial No. 10 2009 011 379.7, filed Mar. 5, 2009, pursuant to 35 U.S.C. 119(a)-(d), the content of which is incorporated herein by reference in its entirety as if fully set forth herein.

BACKGROUND OF THE INVENTION

The present invention relates, in general, to an exhaust gas system.

The following discussion of related art is provided to assist the reader in understanding the advantages of the invention, and is not to be construed as an admission that this related art is prior art to this invention.

In multi-cylinder internal combustion engines, exhaust from the individual cylinders is brought together in exhaust collecting devices. Prior art examples include exhaust manifolds and turbocharger constructions of single-piece configuration to save costs for a bolted connection, as disclosed in U.S. Pat. No. 6,256,990 to Itoh. This means that the same material must be used for the exhaust manifold and the turbocharger, oftentimes a high-alloy special steel. As the material selection focuses always on the weakest link in the entire module, the cost factor is therefore significant. Another drawback involves the high total weight of cast manifold turbocharger modules because certain wall thicknesses of cast constructions cannot fall below a minimum, as opposed to sheet metal constructions.

Published U.S. Pat. Appl. No. 2007/0289954 to Bien et al. describes an exhaust manifold and a turbocharger housing of multipart configuration which are welded together. The exhaust manifold is designed as an airgap-insulated exhaust manifold. Although material costs for the exhaust gas system can be lowered and weight can be saved, still the weld seam zone between the exhaust manifold and the turbocharger housing represents a strength weak point from a thermomechanical standpoint.

It would therefore be desirable and advantageous to provide an improved exhaust gas system which obviates prior art shortcomings and which exhibits superior thermomechanical strength and high rigidity while at the same time being lightweight and yet reliable in operation.

SUMMARY OF THE INVENTION

According to one aspect of the present invention, an exhaust gas system includes a turbocharger housing, and an exhaust manifold having manifold pipes and connected to the turbocharger housing, wherein the turbocharger housing has a pipe collector extending in a direction of the exhaust manifold for connection of the manifold pipes.

The present invention resolves prior art problems by connecting a turbocharger housing with an exhaust manifold. The manifold pipes of the exhaust manifold can hereby be connected to the pipe collector in a separate manufacturing step.

According to another advantageous feature of the present invention, the turbocharger housing and the pipe collector can be made of a common casting. The pipe collector can hereby be formed from a region of the turbocharger housing extending in direction of the exhaust manifold. In terms of function, the pipe collector is thus associated to the exhaust manifold, while being part of the turbocharger.

As a result of such a configuration, the exhaust gas streams of the individual cylinders can be united with optimum flow properties in a cost-efficient manner, while at the same time enabling, for example through formation of a flange, easy implementation to attach an outer shell thereto which meets high strength requirements.

According to another advantageous feature of the present invention, the exhaust manifold may be airgap-insulated.

According to another advantageous feature of the present invention, the pipe collector may be airgap-insulated.

An exhaust gas system according to the invention has many benefits such as light weight, enhanced flow dynamics, compactness, improved strength and bending stiffness, less heat protection requirements as a result of airgap insulation, improved assembly and logistics as a result of elimination of a partition/seal, thereby optimizing costs.

According to another advantageous feature of the present invention, the exhaust manifold can have outer shells disposed in surrounding relationship to the pipe collector.

For airgap insulation, components of the exhaust manifold that are connected to the pipe collector can include inner pipes and outer shells. In the connection zone between exhaust manifold and turbocharger housing, the pipe collector has attachment ports for connection of manifold pipes. The connection between the respective inner pipe and the respective attachment port can advantageously be realized by a sliding fit.

According to another advantageous feature of the present invention, the outer shells are sized to extend beyond the turbocharger-side ends of the gas-conducting inner pipes and welded to the turbocharger housing in a gastight manner such that the sliding fit between the inner pipes and the attachment ports of the pipe collector as well as the pipe collector itself are surrounded by the outer shells and thus airgap-insulated. As a result of the presence of an airgap insulation, the need for heat protection measures can be reduced in the area of the exhaust manifold.

Advantageously, the outer shells of the exhaust manifold may be made of inexpensive material with small wall thicknesses, so that the overall weight of the exhaust gas system as well as costs can be decreased.

Moreover, as a result of the sliding fit connection of the inner pipes of the manifold pipes with the pipe collector and the ensheathing of the sliding fit connection by the outer shells, the need for a welded connection is eliminated between the manifold pipes and the pipe collector, realizing a connection which is substantially stress-free.

Due to the engagement of turbocharger housing and exhaust manifold within one another through intervention of the pipe collector, stiffness of the cast turbocharger housing is transmitted onto the exhaust manifold. The weld seam normally constituting a weak spot between the outer shells of the exhaust manifold and the attachment ports of the turbocharger housing are removed from the direct connection zone but rather are now located axially offset in relation to the sliding fit and thus in relation to the ports. At the same time, the outer shells airgap-insulate part of the turbocharger housing, i.e. the pipe collector.

According to another advantageous feature of the present invention, the turbocharger housing may include a platform in the form of a flange. This flange can be used to permit a welded attachment of a cylinder head flange arranged on the engine-side of the manifold pipes and connected with the engine cylinders. This attachment further enhances high bending stiffness of the exhaust gas system. It is also possible to shift the connection zone between the outer shell of the exhaust manifold and the turbocharger housing far away from the gas-conducting zone so that the thermomechanical strength can be further improved in the critical weld seam zone.

An exhaust gas system according to the present invention therefore combines the advantages of high stiffness and thermomechanical strength of the single-part cast construction of exhaust manifold and turbocharger housing and the advantages of small weight and reduced costs of the two-part construction with airgap-insulated exhaust manifold and cast turbocharger housing.

In addition the configuration of the pipe collector as casting permits the implementation of variations with varying flow properties. One variation may involve, for example, a design of the pipe collector to allow a dual flow upon the turbine wheel. The pipe collector can hereby be subdivided in longitudinal direction in two channels or feeds that are separated from one another in a gastight manner. For example, the exhausts from the manifold pipes of cylinders 1 and 4 of the exhaust manifold of a four-cylinder engine may be conducted separate from the exhausts from the manifold pipes of the cylinders 2 and 3 to the turbine wheel.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
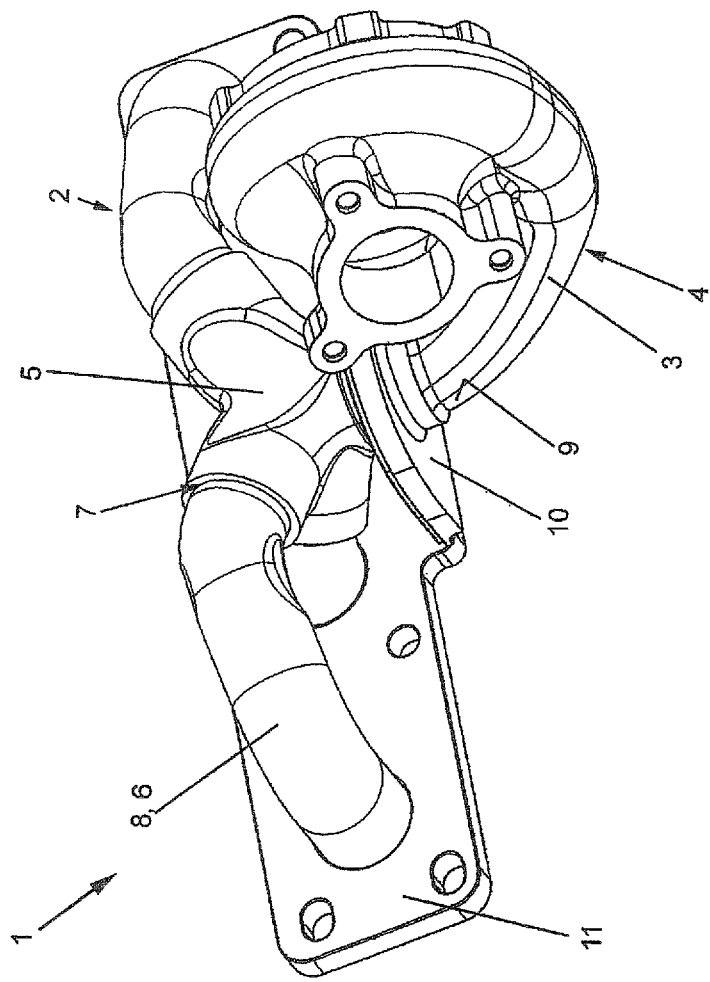
FIG. 1 is a perspective view of one embodiment of an exhaust gas system according to the present invention with a turbocharger housing and an exhaust manifold, depicting internal components of the exhaust manifold (outer shells are not shown)

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of one embodiment of an exhaust gas system according to the present invention, generally designated by reference numeral 1 and including an exhaust manifold 2 of a multi-cylinder engine and connected to a turbocharger housing 3 of a turbocharger 4.

The turbocharger housing 3 includes a pipe collector 5 which unites airgap-insulated manifold pipes 6 of the exhaust manifold 2. The pipe collector 5 is hereby formed by an prolonged area of the turbocharger housing 3 and includes four attachment ports 7 for receiving inner pipes 8 of manifold pipes 6. The connection between the inner pipes 8 and the pipe collector 5 in the attachment ports is realized via unillustrated sliding fits.

A platform in the form of a flange 10 is arranged at the perimeter 9 of the turbocharger housing 3 to enable the turbocharger housing 3 to be welded to a cylinder head flange 11.

Figure 2:
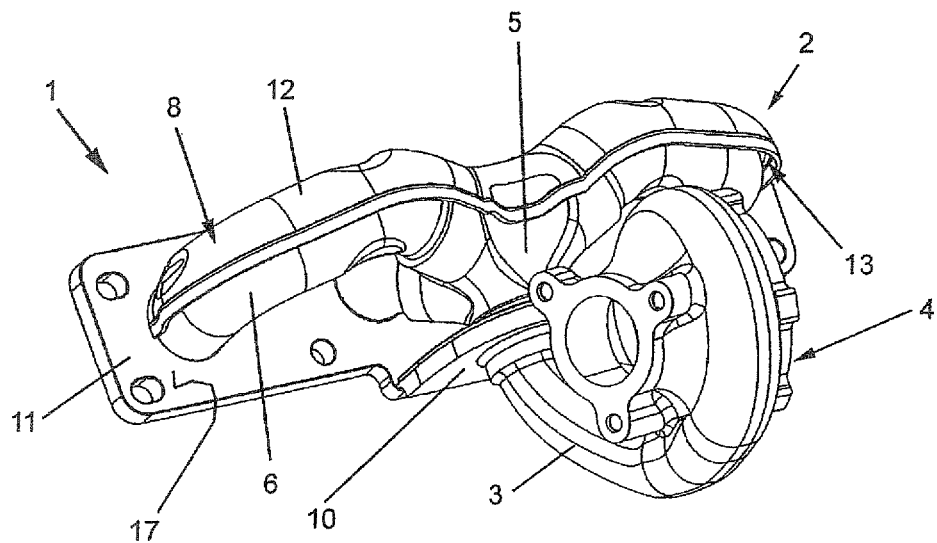
FIG. 2 is a perspective view of the exhaust gas system of FIG. 1 with illustration of the outer shells of the top part of the exhaust manifold.

FIG. 2 shows the exhaust manifold 2 with an upper outer shell 12 and air gap 13 between the inner pipes 8 and the outer shell 12 as well as between the pipe collector 5 and the outer shell 12. The top sides of the inner pipes 8 as well as the pipe collector 5 are completely embraced by the upper outer shell 12.

Figure 3:
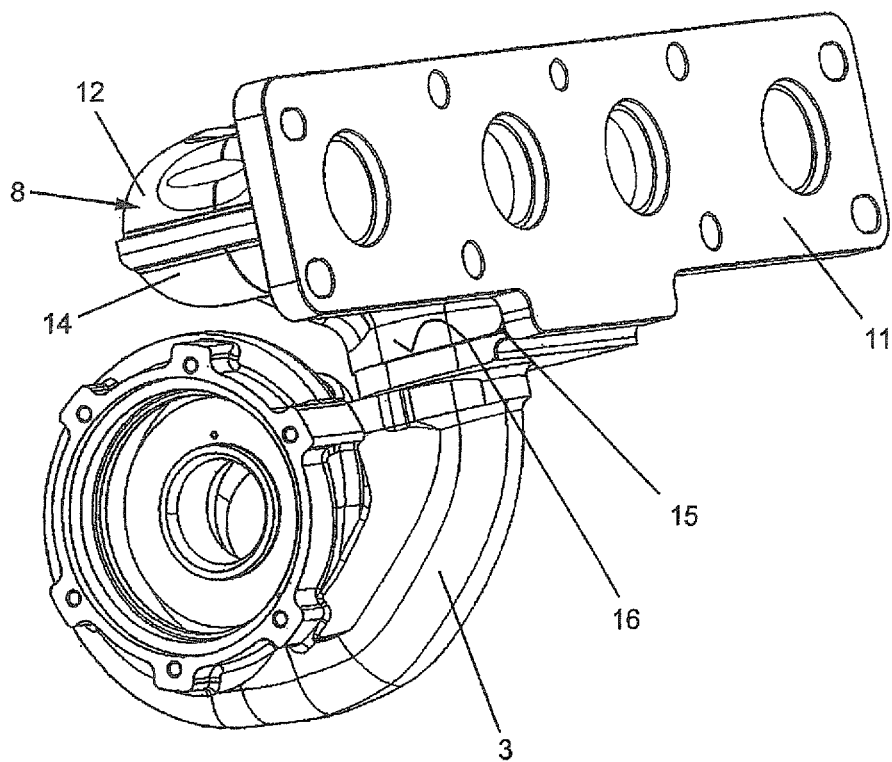
FIG. 3 is a rear perspective view of the exhaust gas system of FIG. 2.

FIG. 3 shows the second bottom-side outer shell 14 which together with the first outer shell 12 fully embrace the manifold pipes 6 as well as the pipe collector 5 so that the pipe collector 5 is also completely airgap-insulated. The outer shell 14 is hereby welded with the turbocharger housing 3 in the area of the flange 10.

The turbocharger housing 3 is attached to the cylinder head flange 11 by a welded connection with a weld seam 15 between a surface 16 of the flange 10 in confronting relationship to the manifold pipes 8 and a surface 17 of cylinder head flange 11 which surface points to the pipe collector 5. This further enhances stiffness of the exhaust gas system 1.

Figure 4:
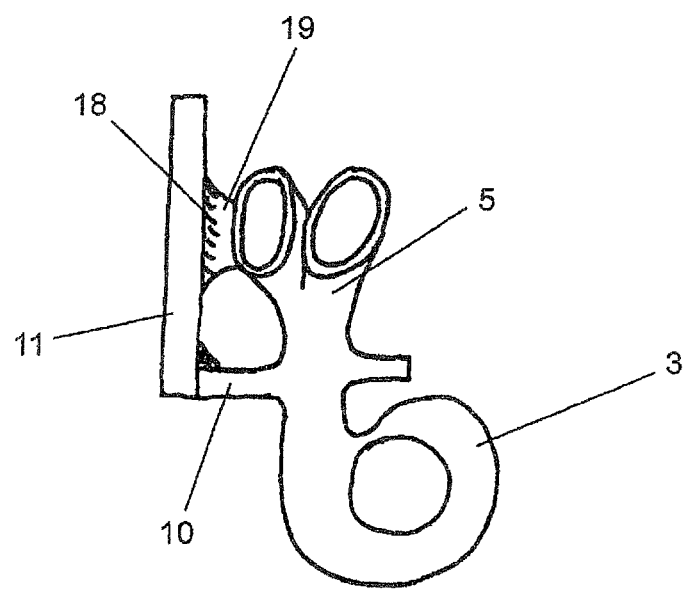
FIG. 4 is a schematic illustration of another embodiment of an exhaust gas system according to the present invention.

FIG. 4 is a highly schematic illustration of another embodiment of an exhaust gas system according to the present invention. Parts corresponding with those in FIG. 1 are denoted by identical reference numerals and not explained again. The description below will center on the differences between the embodiments. In this embodiment, the turbocharger housing 3 and the pipe collector 5 are both components of a common casting. The pipe collector 5 is welded via a cast-on piece 19 by an additional welded connection to the cylinder head flange 11. The cast-on piece 19 is hereby situated at a distance to the flange 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An exhaust gas system, comprising:
   a turbocharger housing; and
   an exhaust manifold having manifold pipes and connected to the turbocharger housing,
   wherein the turbocharger housing has an area which forms a pipe collector extending in a direction of the exhaust manifold for connection of the manifold pipes and having attachment ports for receiving inner pipes of the manifold pipes;
   wherein the inner pipes are connected to the attachment ports of the pipe collector via a sliding fit,
   wherein the pipe collector is airgap-insulated, and
   wherein the pipe collector is subdivided in longitudinal direction in two feeds which are separated from one another in a gastight manner.

2. The exhaust gas system of claim 1, wherein the exhaust manifold has outer shells disposed in surrounding relationship to the pipe collector.

3. The exhaust gas system of claim 2, wherein the outer shells of the exhaust manifold are welded with the turbocharger housing.

4. The exhaust gas system of claim 1, wherein the turbocharger housing and the pipe collector are made of a common casting.

5. The exhaust gas system of claim 1, wherein the exhaust manifold is airgap-insulated.

6. An exhaust gas system, comprising:
   a turbocharger housing; and
   an exhaust manifold having manifold pipes and connected to the turbocharger housing, wherein the turbocharger housing has an area which forms a pipe collector extending in a direction of the exhaust manifold for connection of the manifold pipes and having attachment ports for receiving inner pipes of the manifold pipes, said pipe collector being airgap-insulated, said exhaust manifold having outer shells disposed in surrounding relationship to the pipe collector, wherein the inner pipes are connected to the attachment ports of the pipe collector via a sliding fit; and
   a flange formed on the turbocharger housing for attachment to one of the outer shells.

7. The exhaust gas system of claim 6, wherein the turbocharger housing and the pipe collector are made of a common casting.

8. The exhaust gas system of claim 6, wherein the exhaust manifold is airgap-insulated.

9. The exhaust gas system of claim 6, wherein the outer shells of the exhaust manifold are welded with the turbocharger housing.

10. The exhaust gas system of claim 6, wherein the pipe collector is connected to a cylinder head flange by a welded connection at a distance to the flange.

11. The exhaust gas system of claim 10, wherein the flange is positioned in a transition zone between the turbocharger housing and the pipe collector and welded to the cylinder head flange.

12. The exhaust gas system of claim 6, wherein the outer shells are sized to extend beyond turbocharger-side ends of gas-conducting inner pipes of the manifold pipes and welded to the turbocharger housing in a gastight manner such that the sliding fit between the inner pipes and attachment ports of the pipe collector as well as the pipe collector itself are surrounded by the outer shells and are airgap-insulated.

* * * * *